US010545677B2

(12) United States Patent
Bolli et al.

(10) Patent No.: US 10,545,677 B2
(45) Date of Patent: Jan. 28, 2020

(54) VOLATILE ACCOUNT IDENTIFICATION AND ISOLATION AND RESOURCE MANAGEMENT IN DISTRIBUTED DATA STORAGE SYSTEMS

(71) Applicant: Microsoft Technology Licensing, LLC, Redmond, WA (US)

(72) Inventors: Sumadhur Reddy Bolli, Redmond, WA (US); Liang Xie, Sichuan (CN); Dengkui Xi, Sammamish, WA (US); Arild Einar Skjolsvold, Kenmore, WA (US); Xinhua Ji, Redmond, WA (US); Dengyao Mo, Bellevue, WA (US); Marcus Kimball Swenson, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 16/010,835

(22) Filed: Jun. 18, 2018

(65) Prior Publication Data

US 2019/0384503 A1 Dec. 19, 2019

(51) Int. Cl.
*G06F 12/00* (2006.01)
*G06F 3/06* (2006.01)

(52) U.S. Cl.
CPC ............ *G06F 3/0613* (2013.01); *G06F 3/067* (2013.01); *G06F 3/0653* (2013.01)

(58) Field of Classification Search
CPC ...... G06F 3/061; G06F 3/0613; G06F 3/0653; G06F 3/067
See application file for complete search history.

(56) References Cited

U.S. PATENT DOCUMENTS

| 8,312,460 | B1 | 11/2012 | Blanding | |
|---|---|---|---|---|
| 9,736,243 | B2 | 8/2017 | Chablani et al. | |
| 10,387,402 | B2* | 8/2019 | Stefani | |
| 2007/0081462 | A1* | 4/2007 | Gefflaut | H04W 28/08 370/235 |
| 2013/0322242 | A1* | 12/2013 | Swenson | H04L 47/11 370/232 |
| 2015/0106811 | A1 | 4/2015 | Holler et al. | |
| 2015/0378635 | A1 | 12/2015 | Skjolsvold et al. | |
| 2017/0220281 | A1 | 8/2017 | Gupta et al. | |

OTHER PUBLICATIONS

Brad Calder et al.; "Windows Azure Storage: A Highly Available Cloud Storage Service With Strong Consistency"; SOSP '11 Proceedings of the Twenty-Third ACM Symposium on Operating Systems Principles; 2011; pp. 143-157.
"International Search Report and Written Opinion Issued in PCT Application No. PCT/US19/036434", dated Sep. 16, 2019, 11 Pages.

* cited by examiner

*Primary Examiner* — Shawn X Gu
(74) *Attorney, Agent, or Firm* — Alleman Hall Creasman & Tuttle LLP

(57) ABSTRACT

A traffic manager for a distributed data storage system includes an iterative spike identifier to identify N levels of traffic spikes in traffic data on an account basis in a distributed data storage system, where N is greater than zero. A traffic cycle identifier selectively identifies cyclic traffic spikes in at least one of the N levels of traffic spikes for each of a plurality of accounts using autocorrelation and peak detection. A partition manager communicates with the traffic cycle identifier and selectively partitions one of the plurality of accounts based on based on the autocorrelation and peak detection.

20 Claims, 10 Drawing Sheets

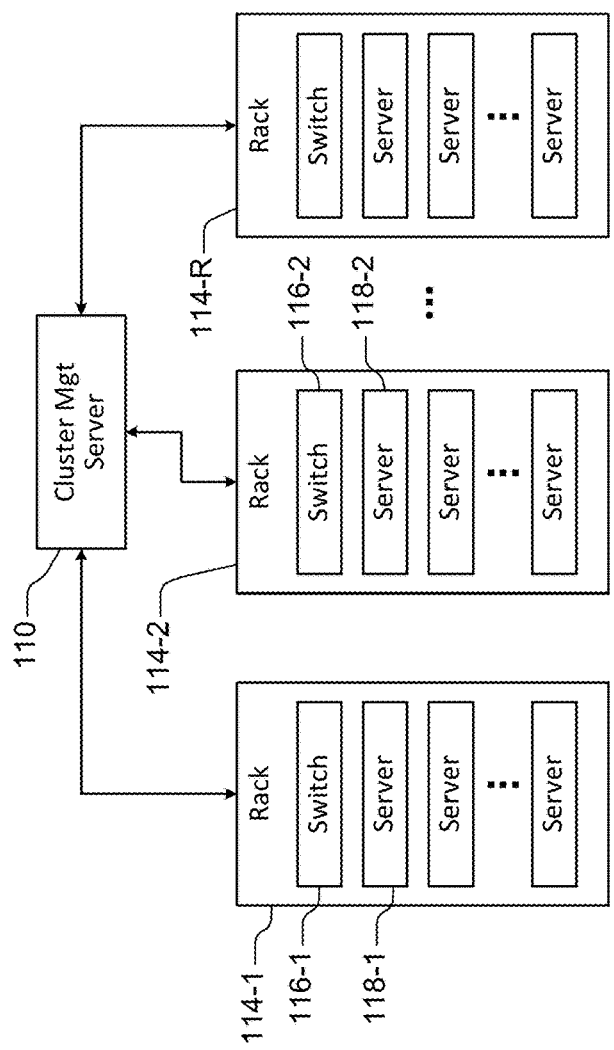
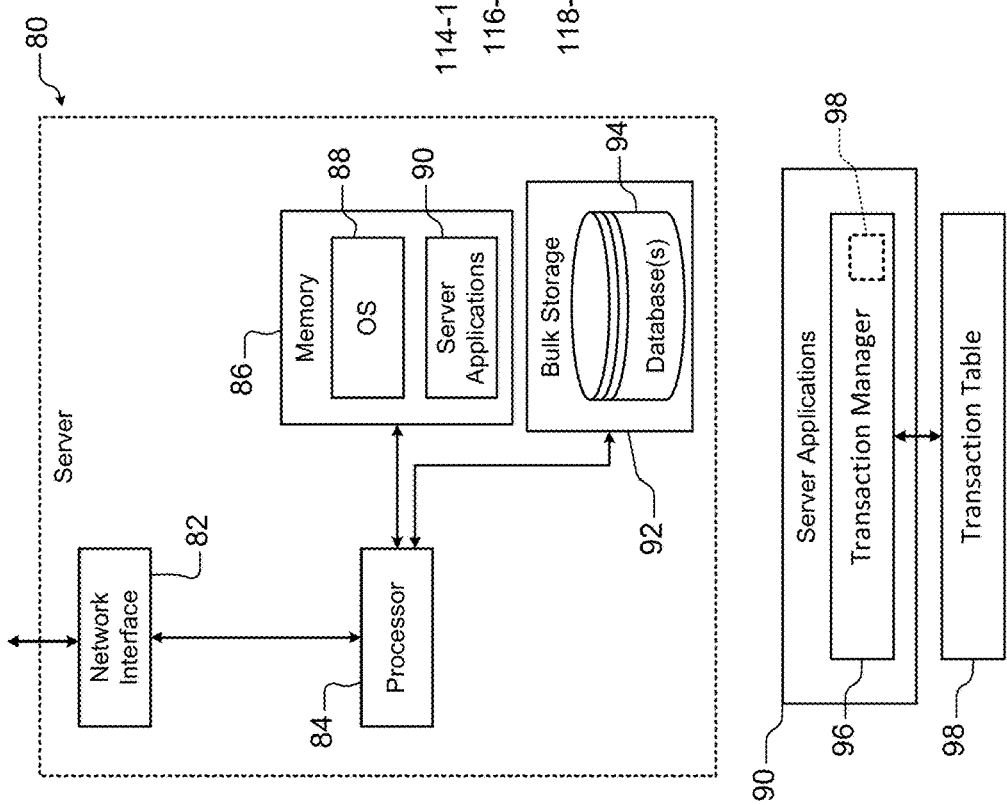

VOLATILE ACCOUNT IDENTIFICATION AND ISOLATION AND RESOURCE MANAGEMENT IN DISTRIBUTED DATA STORAGE SYSTEMS

FIELD

The present disclosure relates to distributed data storage systems, and more particularly to identification and isolation of volatile accounts and resource management in distributed data storage systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed data storage and computing systems are often used by enterprises to add computing and storage capacity as needed without requiring the enterprise to build out the infrastructure in advance. For example, cloud service providers rent data storage and computing resources (such as physical machines, virtual machines and containers) to tenants. Examples of data that is stored include unstructured user files or blobs, tables (structured storage) and queues (message delivery). To provide the cloud services, cloud service providers typically employ one or more data centers that include clusters of server racks. Each of the server racks generally includes a switch, a plurality of servers, and/or data storage devices.

Tenants use the computing resources and data storage in a variety of different ways. Some tenants simply use the data storage provided by the cloud network. Other tenants use both the computing resources and the data storage provided by the cloud network. Examples uses include web hosting, social networking, and/or enterprise support.

Distributed data storage systems serve as an important infrastructure for the data storage. The distributed data storage systems provide clusters of storage devices and servers to manage storage. Tenants share the same distributed data storage systems. The sharing of the distributed data storage systems helps to reduce the cost for each user. However, users in the same distributed data storage systems may adversely impact one another, especially when they are operating the storage system extensively.

When data traffic of an account spikes, resources of the distributed data storage systems that are pre-allocated to the users are strained. Some distributed data storage systems can react to the increased traffic volume and increase the allocated resources when heavy traffic occurs to provide load balancing. However, the distributed data storage systems need time to increase resources to meet the variable demand. In addition, when the load balancing system responds to the traffic spike, it is already too late and damage to the distributed data storage system may have already occurred.

SUMMARY

A traffic manager for a distributed data storage system includes an iterative spike identifier to identify N levels of traffic spikes in traffic data on an account basis in a distributed data storage system, where N is greater than zero. A traffic cycle identifier selectively identifies cyclic traffic spikes in at least one of the N levels of traffic spikes for each of a plurality of accounts using autocorrelation and peak detection. A partition manager communicates with the traffic cycle identifier and selectively partitions one of the plurality of accounts based on based on the autocorrelation and the peak detection.

In other features, the iterative spike identifier identifies the N levels of traffic spikes using N spike thresholds, respectively. The iterative spike identifier summarizes the traffic data into quartiles for each of the N levels of traffic spikes and the N spike thresholds are based on at least one of the quartiles for the corresponding one of the N levels of traffic spikes. The N spike thresholds are based on a sum of a third quartile, a factor and an interquartile range for the corresponding one of the N levels of traffic spikes.

In other features, the partition manager includes a metric calculation module to calculate a plurality of metrics for the N levels of traffic spikes for the plurality of accounts. The partition manager further includes a trigger comparing module to compare the plurality of metrics to a plurality of triggers, respectively.

In other features, the partition manager further includes a filtering module to identify a partition candidate account from the plurality of accounts having a predetermined subset of the plurality of the metrics exceeding corresponding ones of the plurality of triggers. The partition manager selectively partitions the partition candidate account.

In other features, the metric calculation module uses machine learning to predict metrics based on the plurality of metrics.

A traffic manager for a distributed data storage system includes a processor and a non-transitory computer-readable medium to traffic management instructions for execution by the processor. The traffic management instructions are configured to iteratively identify N levels of traffic spikes in traffic data on an account basis in a distributed data storage system, where N is greater than zero; selectively identify cyclic traffic spikes in at least one of the N levels of traffic spikes for each of a plurality of accounts using autocorrelation and peak detection; and selectively partition one of the plurality of accounts based on based on the autocorrelation and the peak detection.

In other features, the traffic management instructions are configured to identify the N levels of traffic spikes using N spike thresholds, respectively. The traffic management instructions are configured to summarize the traffic data into quartiles for each of the N levels of traffic spikes, wherein the N spike thresholds are based on at least one of the quartiles for the corresponding one of the N levels of traffic spikes. The N spike thresholds are based on a sum of a third quartile, a factor and an interquartile range for the corresponding one of the N levels of traffic spikes.

In other features, the traffic management instructions are configured to calculate a plurality of metrics for the N levels of traffic spikes for the plurality of accounts. The traffic management instructions are configured to compare the plurality of metrics to a plurality of triggers, respectively.

In other features, the traffic management instructions are configured to identify a partition candidate account from the plurality of accounts having a predetermined subset of the plurality of the metrics exceeding corresponding ones of the plurality of triggers. The traffic management instructions are configured to partition the partition candidate account. The traffic management instructions are configured to predict metrics use machine learning based on the plurality of metrics.

A method for managing data traffic in a distributed data storage system includes iteratively identifying N levels of traffic spikes in traffic data on an account basis in a distributed data storage system, where N is greater than zero; selectively identifying cyclic traffic spikes in at least one of the N levels of traffic spikes for each of a plurality of accounts using autocorrelation and peak detection; and selectively partitioning one of the plurality of accounts based on based on the autocorrelation and the peak detection.

In other features, the method includes grouping the traffic data into quartiles for each of the N levels of traffic spikes and identifying the N levels of traffic spikes using N spike thresholds, respectively. The N spike thresholds are based on at least one of the quartiles for the corresponding one of the N levels of traffic spikes.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 1C and 1D are functional block diagrams of an example of a server including a transaction table manager and a transaction table;

FIG. 1E is a functional block diagram of an example of a cluster of server racks;

In the drawings, reference numbers may be reused to identify similar and/or identical elements.

DETAILED DESCRIPTION

Systems and methods according to the present disclosure relate to load balancing in distributed data storage systems such as cloud data storage systems. In some examples, the load balancing is pro-active. Statistical analysis is used to identify data traffic spikes in tenant accounts. The statistical analysis is also used to identify recurring traffic patterns of an account or a group of accounts. A determination is made with respect to the cyclicality and magnitude of the traffic spikes for an account. The distributed data storage system is also selectively configured to accommodate future data traffic spikes for the account.

Distributed data storage systems can be implemented in a cloud network that provides cloud data services across different geographic regions using one or more data centers. The cloud network typically includes a fabric controller to provision resources, manage allocated resources, handle deployment/upgrade, and/or manage the cloud services.

The tenant typically rents computing resources in the cloud network to run tenant applications and/or stores user files or blobs using storage applications run by the cloud network. The storage applications perform storage-related services including managing data placement across the disks in the clusters, replication of the data and/or load balancing of the data across the clusters. Components of the cloud network running the tenant applications include physical machines, virtual machines or containers (implemented by nodes or servers in the server racks).

Figure 1A:
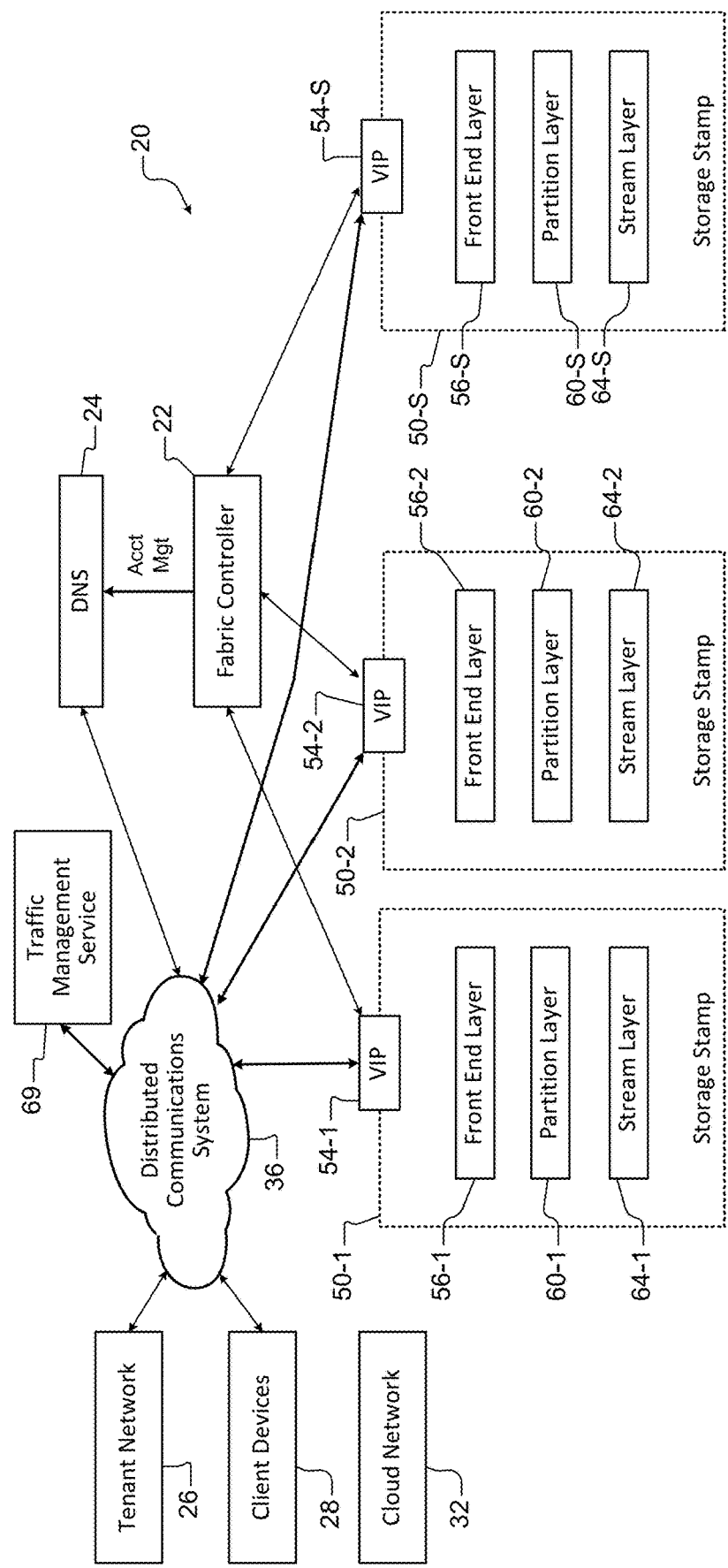
FIG. 1A is a functional block diagram of an example of a distributed data storage system monitored by a data traffic management system according to the present disclosure.

Referring now to FIG. 1A, a distributed data storage system 20 such as a cloud network is shown. While an example of a cloud network is shown for purposes of illustration, other network architectures may be used. A fabric controller 22 provisions resources, manages allocated resources, handles deployment/upgrade, and/or manages the cloud services. The fabric controller 22 performs account management by setting up IP addresses for storage stamps and coordinating with one or more domain name servers (DNS) 24. Storage requests can be received from any number of different locations including a tenant network 26, client devices 28, cloud networks 32 and/or other locations via a distributed communication system 36 such as the Internet.

The fabric controller 22 configures storage stamps 50-1, 50-2, . . . 50-S (collectively storage stamps 50) (where S is an integer greater than zero) as needed. In some examples, the fabric controller 22 assigns virtual IP addresses 54-1, 54-2, . . . 54-S (collectively VIP 54) for each of the storage stamps 50. Each of the storage stamps 50-1, 50-2, . . . 50-S includes a front end layer 56-1, 56-2, . . . 56-S (collectively front end layers 56), partition layers 60-1, 60-2, . . . 60-S (collectively partition layers 60), and stream layers 64-1, 64-2, . . . 64-S (collectively stream layers 64).

A traffic management service 69 communicates with the storage stamps 50. The traffic management service 69 includes one or more servers or server racks (e.g. similar to those shown in FIGS. 1D and 1E) that run a traffic management application as described further below. In some examples, the traffic management service 69 receives a copy of transaction tables for the storage stamp 50 or other tables with traffic data information.

Initially, the storage stamps 50 will have one partition. As usage increases, additional partitions will be added to the storage stamps 50 on an as-needed basis. In some examples, a partition map is created and includes partition name ranges and the corresponding assigned partition server.

The requests can be received from a tenant located remotely, tenant applications running remotely or within the cloud network, users, and/or other sources. Upon receiving a request for data storage services, the front end layers 56 authenticate and authorize the request. The front end layers 56 route the request to one of the partition servers in the partition layers 60.

The partition layers 60 manage higher level abstractions of user files, structured storage, and/or messaging. The partition layers 60 also provide a scalable index, transaction ordering, and storing consistency for objects. The partition layers 60 can specifically support storing object data on top of the stream layers 64. In some examples, the partition layers 60 partitions data objects within a storage stamp.

The stream layers 64 store bits on the disks and replicate the data across multiple servers to keep the data durable within the storage stamps 50. The stream layers 64 supports block lists each including one or more blocks. The stream layers 64 store and replicate the blocks. The data stored in the stream layers 64 is accessible from the partition layers 60. The stream layers 64 may provide a file system namespace and an Application Programming Interface (API) for the partition layers 60 to perform writes.

The interface between the stream layers 64 and the partition layers 60 allows a tenant to store, read, delete, rename, append to, and/or concatenate data streams. An extent includes a sequence of blocks. A stream refers to an ordered list of extents. An extent can be a sealed in that it can no longer be appended to. The storage applications read data from extents to access the blocks within the extents.

The stream layers 64 can include a stream manager (not shown) and extent nodes (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents associated therewith and where the peer replicas are for a given extent.

Additional details relating to a distributed data storage system are described in commonly-assigned U.S. Pat. No. 9,736,243, issued Aug. 15, 2017, and entitled "Multiple Transaction Logs in a Distributed Storage System," and Calder, Brad et al., "Windows Azure Storage: A Highly Available Cloud Storage Service with Strong Consistency" SOSP '11 Proceedings of the Twenty-Third ACM Symposium on Operating Systems Principles, 2011: Pages 143-157, which both are incorporated herein by reference in their entirety.

Figure 1B:
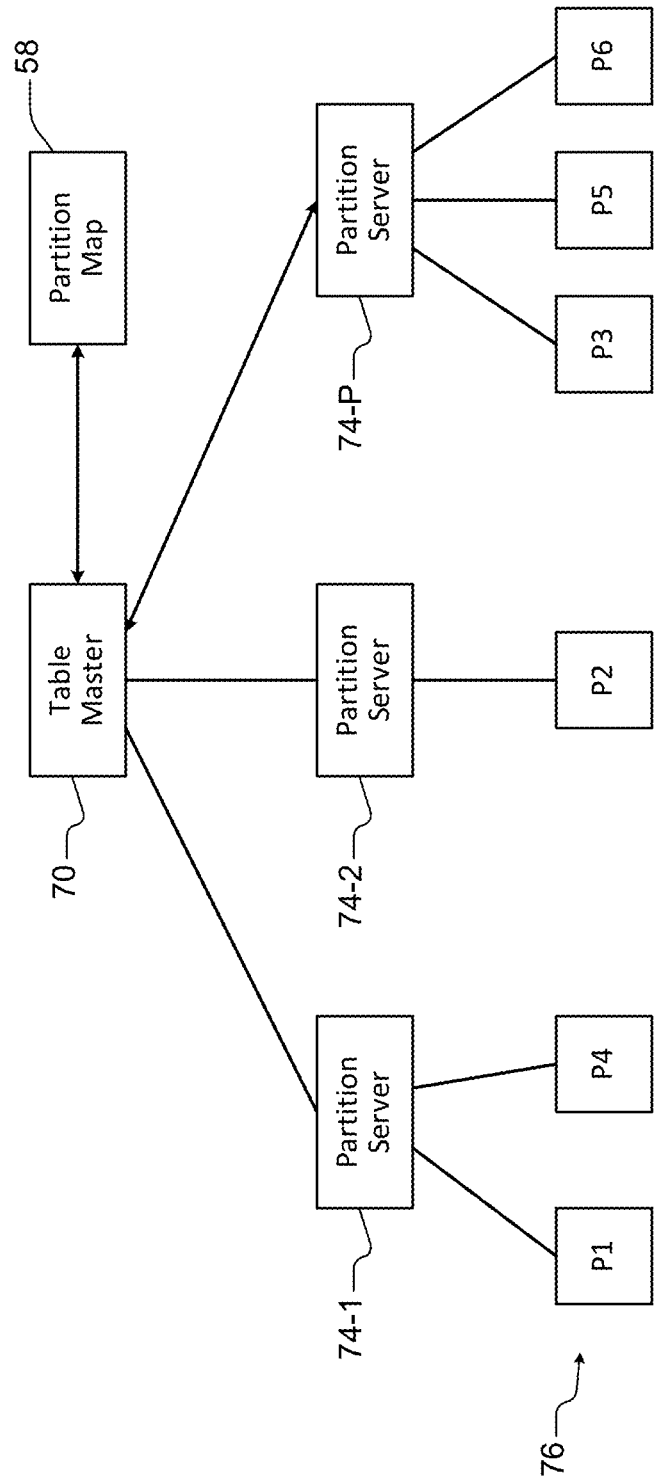
FIG. 1B is a functional block diagram illustrating an example of partitioning within a storage stamp.

Referring now to FIG. 1B, an example of partitioning of a storage stamp is shown. A partition master server 70 divides the storage system into a plurality of partitions 76 (e.g., P1, P2, . . . , and P6 in FIG. 1B) using one or more partition servers 74-1, 74-2, and 74-P (collectively partition servers 74) where P is an integer. The partition servers 74 store data and provide access to the data in the storage system. The partition master server 70 is configured to assign the partitions to the partition servers 74. The partition master server 70 is further configured to control load balancing of the partitions on the partition servers 74. As will be described further below, the traffic management service 69 is also configured to control load balancing due to cyclic data traffic spikes. Additionally, the partition master server 70 is configured to monitor resource utilization with respect to any of the partitions and/or the partition servers 74.

The data storage can be accessed using a key space that is divided amongst the plurality of partitions 76. In the example shown in FIG. 2, the server 74-1 is hosting partitions P1 and P4, the server 74-2 is hosting partition P1, and the server 74-P is hosting P3, P5 and P6.

Referring now to FIGS. 1C-1D, an example of a server 80 is shown. In FIG. 1C, the server 80 includes a network interface 82, one or more processors 84 and memory 86. While the server is shown as a physical machine, virtual machines and/or containers may also be used. The memory 86 includes an operating system and one or more server applications. The server 80 may further include bulk storage 92 such as one or more hard disk drives. The bulk storage 92 may store one or more tables and/or databases 94.

In FIG. 1D, the server applications 90 include a transaction table manager 96 that executes instructions for managing a transaction table 98, which stores transactions relating to blobs. In some examples, the transaction table 98 is stored locally at the transaction table manager 96 and/or remotely in the databases 94 or another location. In some examples, the transaction table manager 96 adds and removes blobs from the transaction table and/or storage stamps in response to the request from the tenants. In addition to providing a record of requests, the transaction table 98 also determines or reflects what is stored in the storage stamps 50.

Referring now to FIG. 1E, a cluster management server 110 manages one or more clusters each including one or more server racks 114-1, 114-2, . . . and 114-R (collectively server racks 114) where R is an integer. Each of the server racks 114-1, 114-2, . . . and 114-R includes a switch 116-1, 116-2, . . . and 116-R (collectively switch 116), and one or more servers 118-1, 118-2, . . . and 118-R (collectively servers 118).

Figure 2:
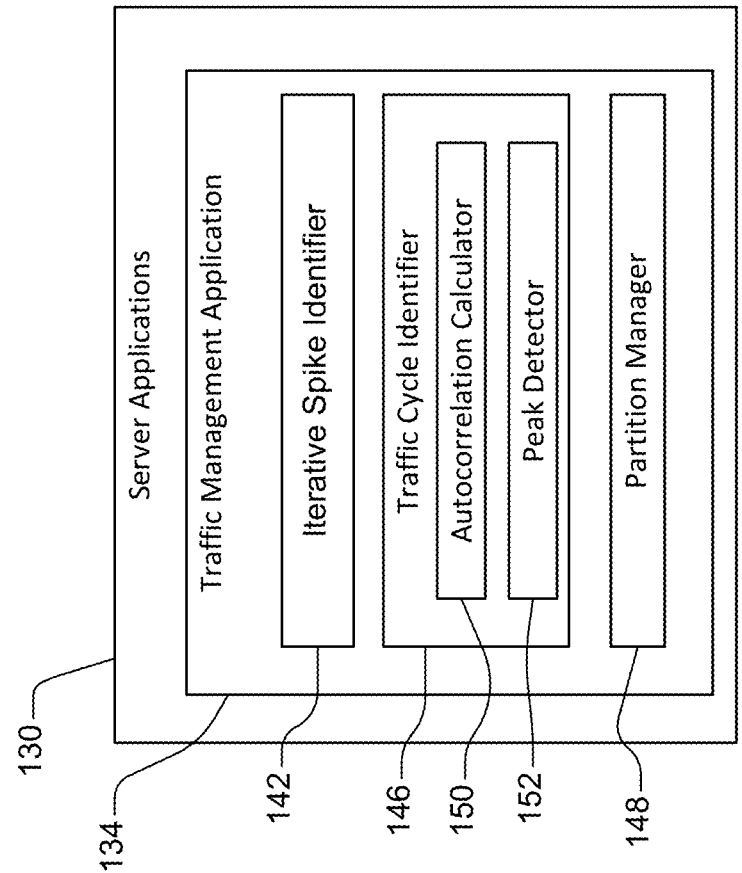
FIG. 2 is a functional block diagram of an example of a server application including a data traffic management application with an iterative traffic spike identifier, a traffic cycle identifier and a partition manager according to the present disclosure.

Referring now to FIG. 2, the traffic management service 69 runs one or more server applications 130 including a traffic management application 134 on one or more servers. As can be appreciated, while the traffic management application 134 is shown on one server, one or more servers such as those shown in FIG. 1C may be used. In other words, subcomponents of the traffic management application 134 can be distributed across the servers.

The traffic management application 134 includes an iterative spike identifier 142 that identifies data traffic spikes in the transactions for an account and then iteratively analyzes the data traffic spikes (or spike levels) to identify spikes within spikes as will be described further below. The traffic management application 134 further includes a traffic cycle identifier 146 that includes autocorrelation calculator 150 that performs autocorrelation on the traffic data to identify traffic cycles. A peak detector 152 identifies peaks in the autocorrelation data. The traffic cycle identifier 146 and/or the partition manager 148 analyzes the location, magnitude and periodicity of the peaks. The partition manager 148 also generates and analyzes other traffic metrics. Based on the periodicity, location and magnitude of the peaks and analysis of the other traffic metrics, the partition manager 148 selectively partitions an account.

Figure 3:
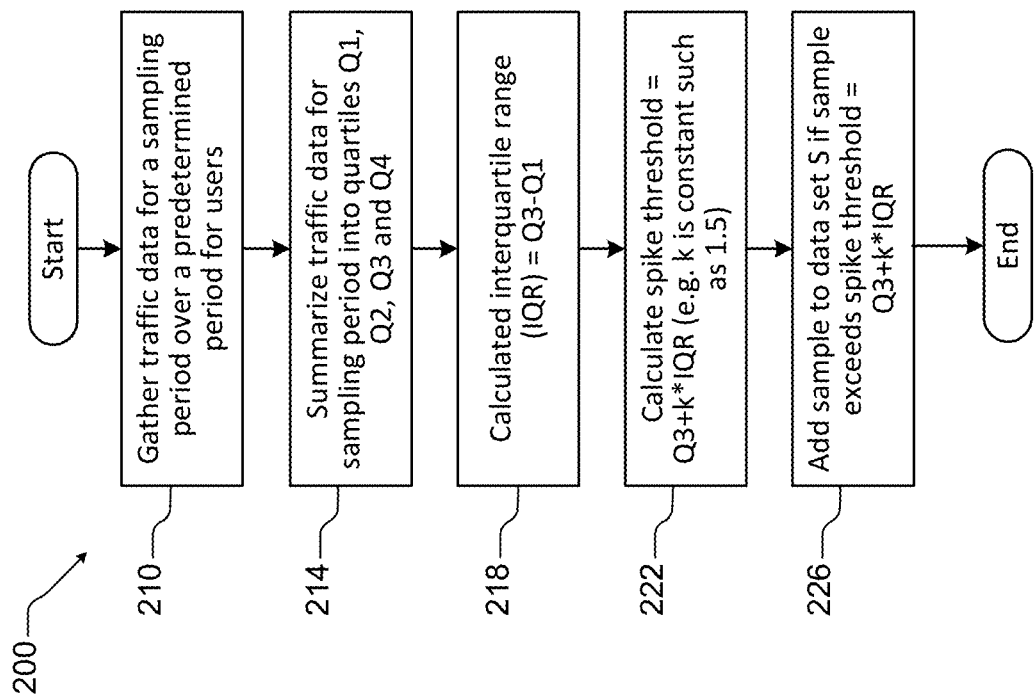
FIG. 3 is a flowchart of an example of a method to identify spikes in data traffic according to the present disclosure.
Figure 4:
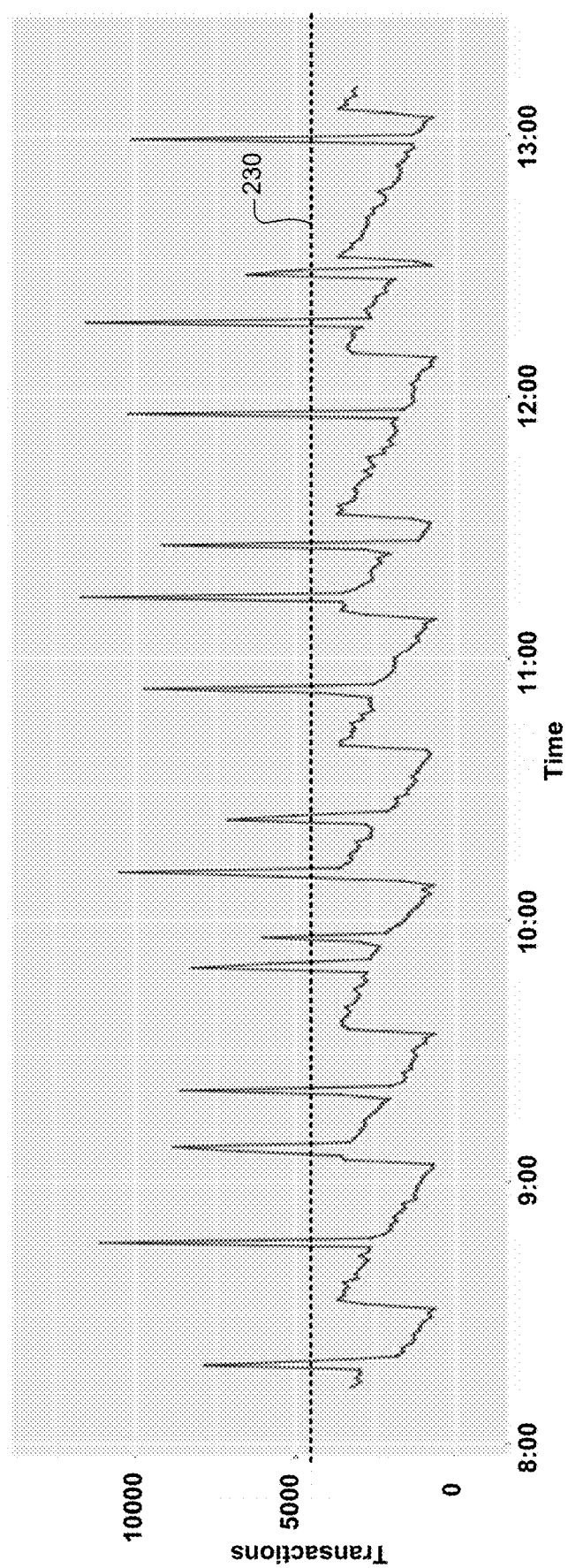
FIG. 4 is a graph showing an example of transaction counts for an account as a function of time according to the present disclosure.

Referring now to FIGS. 3 and 4, data traffic spikes are identified in the traffic data on an account basis. A method 200 for identifying the traffic spikes is shown in FIG. 3. At 210, traffic data is gathered during successive sampling periods over a predetermined period for one or more accounts. In some examples, the sampling period is in a predetermined range from 10 seconds to 5 minutes. In other examples, the sampling period is in a predetermined range from 30 seconds to 2 minutes. In some examples, the sampling period is equal to 1 minute. In some examples, the predetermined period is in a range from one-half day to four weeks. In some examples, the predetermined period is in a range from one day to one week.

At 214, statistical analysis is performed. For example, the traffic data is summarized for the sampling period into quartiles Q1, Q2, Q3 and Q4. At 218, an interquartile range (IQR) is calculated. In some examples the IQR=Q3−Q1. At 222, a spike threshold is calculated. In some examples, the spike threshold is equal to Q3+k*IQR, where k is a constant. In some examples, k is set equal a value in a predetermined range from 1 to 2.

At 226, the sample is added to a data set S if the sample exceeds the spike threshold. In FIG. 4, a graph shows an example of transactions over a period from 8:00 until 13:00. As can be seen, the data includes spikes that are above a threshold 230.

Figure 5:
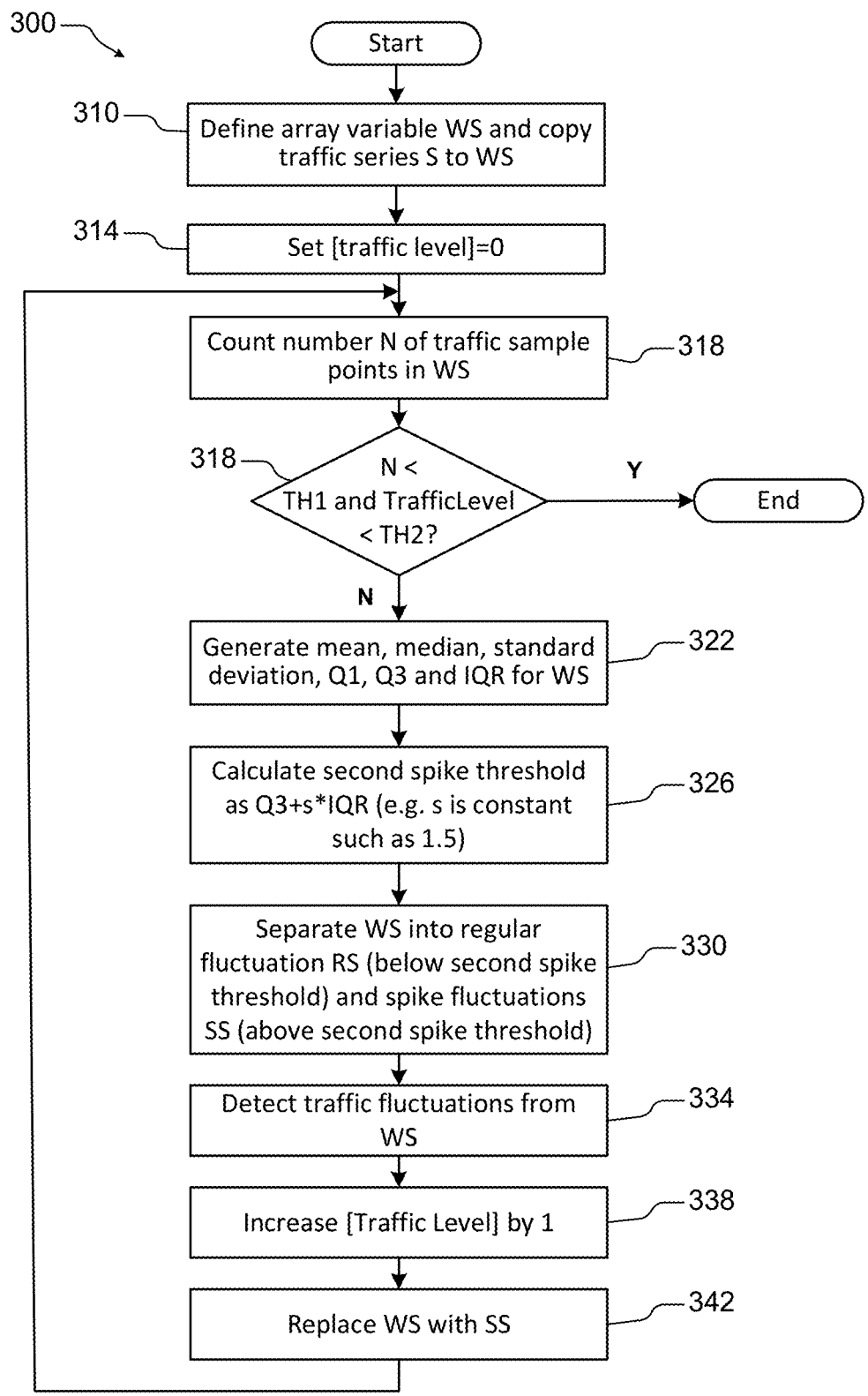
FIG. 5 is a flowchart of an example of a method for iteratively identifying spikes in data traffic for an account according to the present disclosure.
Figure 6:
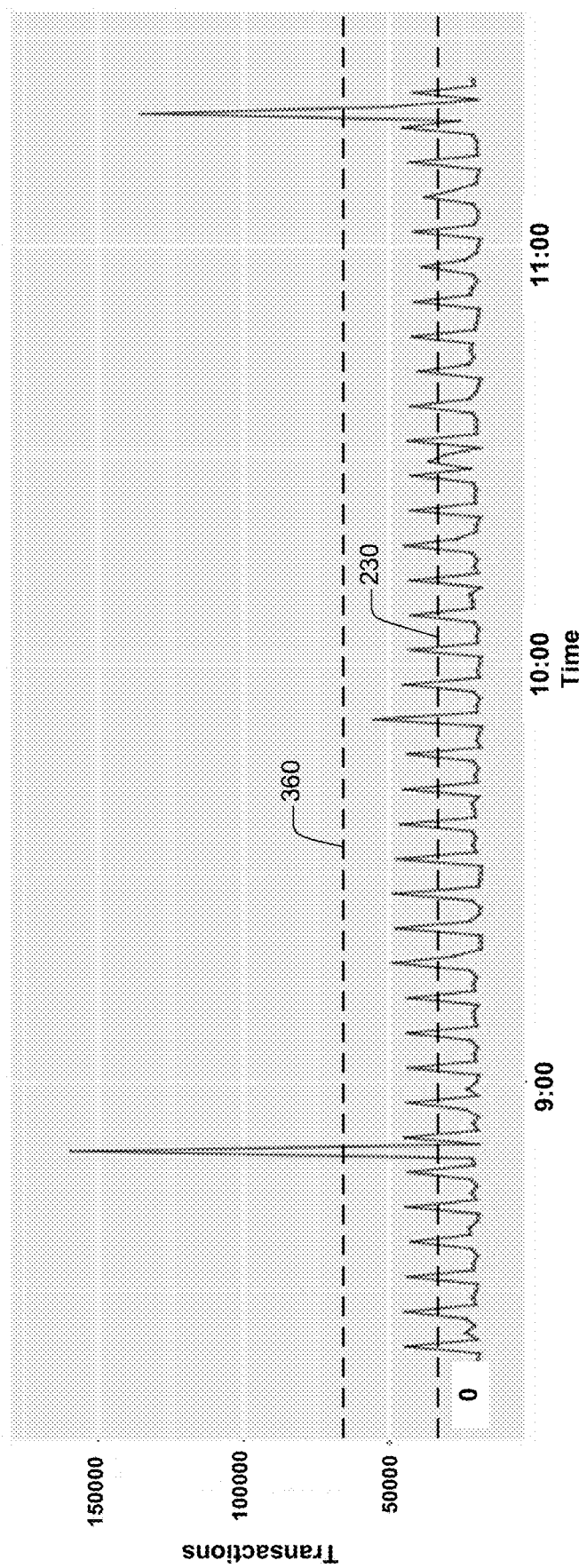
FIG. 6 is a graph showing an example of transaction counts for an account as a function of time with multiple spike thresholds according to the present disclosure.

Referring now to FIGS. 5 and 6, a method 300 for iteratively identifying N−1 additional spike (or traffic) levels is shown (where N is an integer). At 310, an array variable WS is defined. The traffic series S is copied to the array variable WS. At 314, the traffic level is set equal to zero. At 318, the number N of samples in the array variable WS is counted. The method determines whether N is less than a predetermined threshold TH1. In some examples, the threshold is set equal to 5, although other thresholds can be used. In addition, step 318 may also compare the traffic level to a predetermined traffic threshold TH2.

If 318 is false, the method generates the mean, median, standard deviation, Q1, Q3 and IQR for the array variable WS at 322. At 326, the method calculates a second spike threshold equal to Q3+s*IQR, where s is a constant. In some examples, s is set equal a value in a predetermined range from 1 to 2.

At 330, the array variable WS is separated into regular fluctuation RS below the second spike threshold and spike fluctuations SS above the second spike threshold. At 334, the traffic fluctuations are deleted from the array variable WS. At 338, the traffic level is increased by one level. At 342, the array variable WS is replaced with SS. The method returns to 318 and performs additional iterations until an event occurs, a predetermined number of cycles are completed, or the samples remaining after 318 are less than or equal to the threshold.

In FIG. 6, the number of transactions is shown as a function of time after processing using two thresholds 230 and 360. As can be appreciated, additional thresholds may be defined depending on the data.

Figures 7, 8:
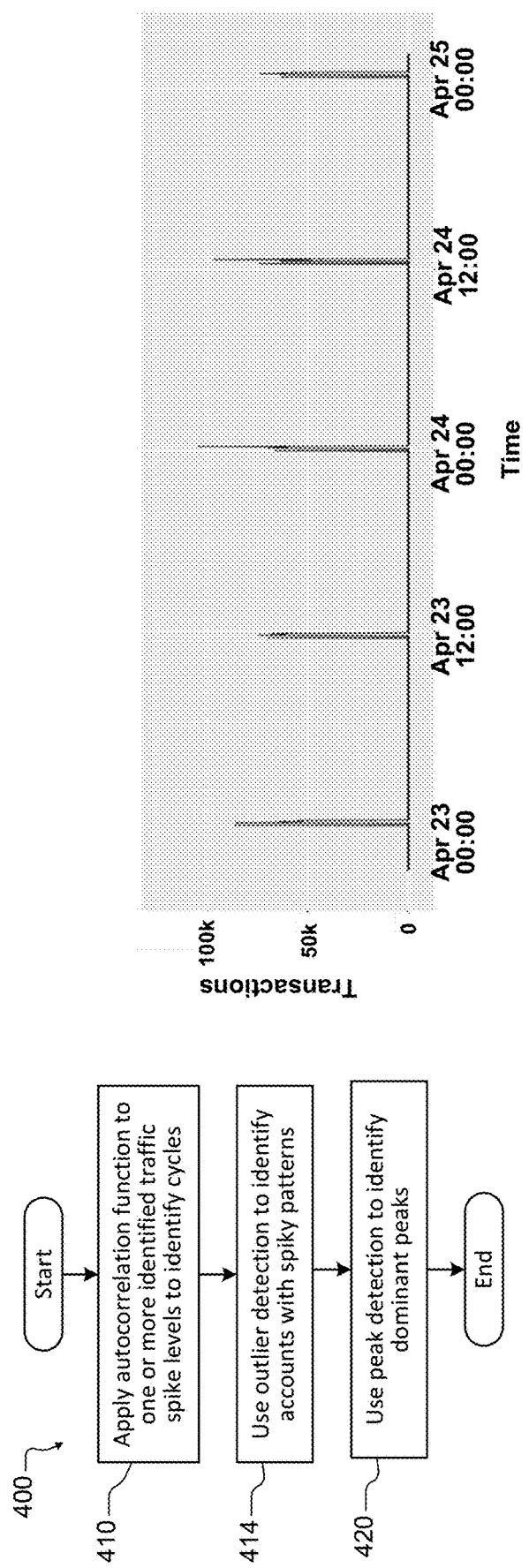
FIG. 7 is a flowchart of an example of a method for using autocorrelation and peak detection traffic metrics on the data traffic spike levels to find cyclic traffic patterns according to the present disclosure.
FIGS. 8 and 9 are graphs showing examples of a cyclic traffic pattern of an account identified using autocorrelation and peak detection according to the present disclosure.

Referring now to FIG. 7, a method 400 for using an autocorrelation function to identify cyclic patterns in the spike level data is shown. At 410, an autocorrelation function is applied to one or more of the identified traffic spike levels to identify cycles. At 414, outlier detection is used to identify accounts with spiky patterns. At 420, use peak detection to identify dominant peaks. In some examples, the peak detection includes setting a predetermined percentile (such as $50^{th}$ percentile), identifying a spike threshold k corresponding to the predetermined percentile, and identifying data points greater than the spike threshold k. A median of the data points greater than the spike threshold is identified as the dominant peak. If the traffic spikes are cyclical, the method also determines the spike period and/or the magnitude and/or duration of the cyclical pattern.

The auto-correlation function is used to identify and quantify traffic spike cycles. After separating a traffic series into several spike levels, the auto-correlation function is applied to each spike threshold level for cycle identification. In some examples, the auto-correlation function is a function of time lag. For each time lag of interest, the series is shifted by that number of time lags, the shifted series is compared to the original series, and the correlation is performed between the two series.

In some examples, the formula to calculate auto-correlation function is shown below.

$$ACF(h) = \frac{\sum_{t=1}^{N-|h|}(x_{t+|h|} - \bar{x})(x_t - \bar{x})}{\sum_{t=1}^{N} x_t^2}$$

In the formula, $x_t$ represents the traffic at time t. $\bar{x}$ represents the traffic mean, and h represents the time lag.

Figure 9:
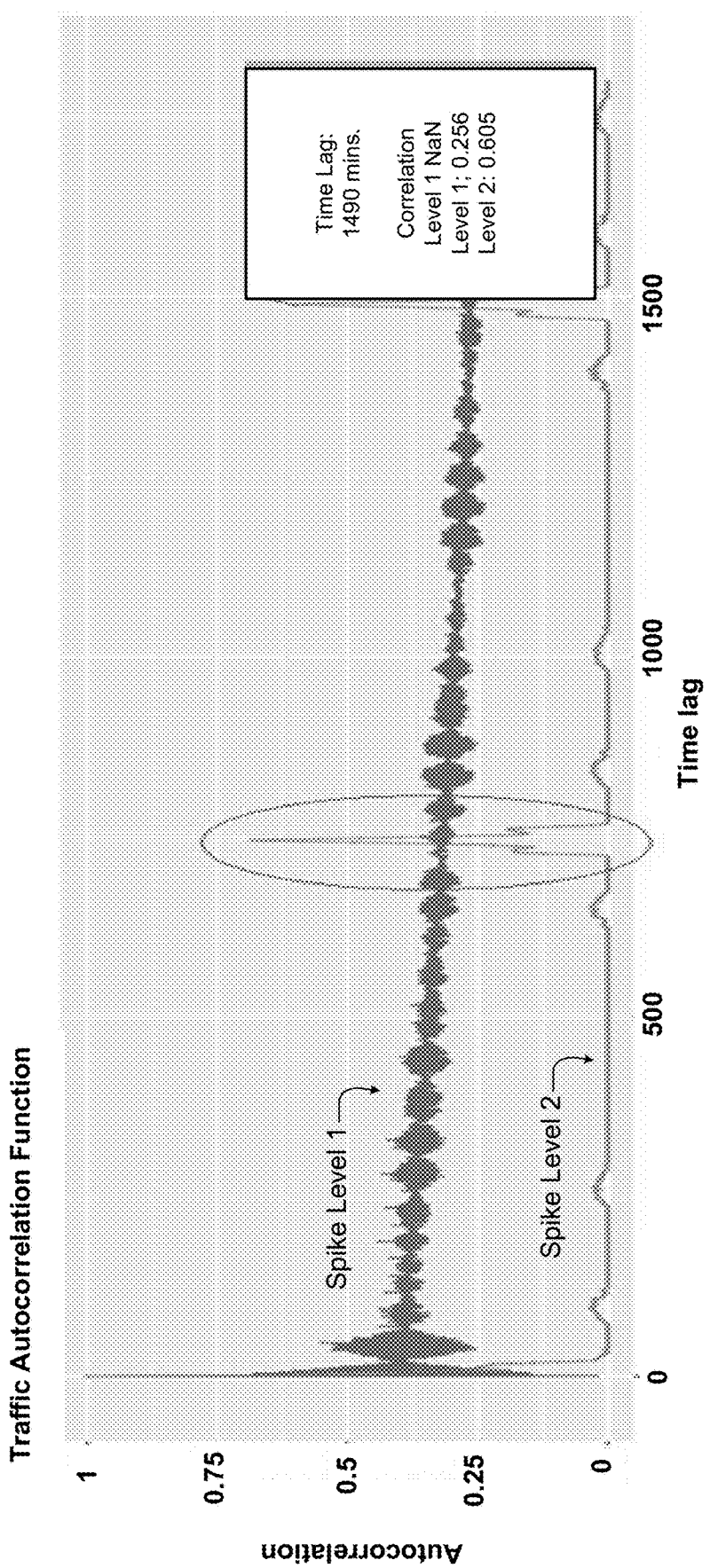

Referring now to FIGS. 8 and 9, example of autocorrelation are shown. In FIG. 8, an example illustrates an account with a sampling period equal to 1 minute and the corresponding auto-correlation. Using the spike information in the spike levels, the traffic management system identifies that traffic spikes occur every 745 minutes. Once the traffic auto-correlation is calculated, a peak detection algorithm is used to identify the smallest dominant peak, which is the traffic cycle.

Once the traffic pattern of a user is identified, spiky transactions can be identified and quarantined. For example, spiky transactions can be quarantined to separate containers to prevent adverse impact on other users in the same infrastructure. For the users with strongly cyclical traffic, predictions can be made when the next spike will occur and additional resources can be applied in advance of the anticipated spike to balance the traffic load.

In FIG. 9, the autocorrelation function for the spike level 1 does not show a sufficiently high correlation to identify a cyclical pattern. The autocorrelation function for the spike level 2 shows increased correlation and a recurring spike pattern that may be the basis for partition.

Figure 10:
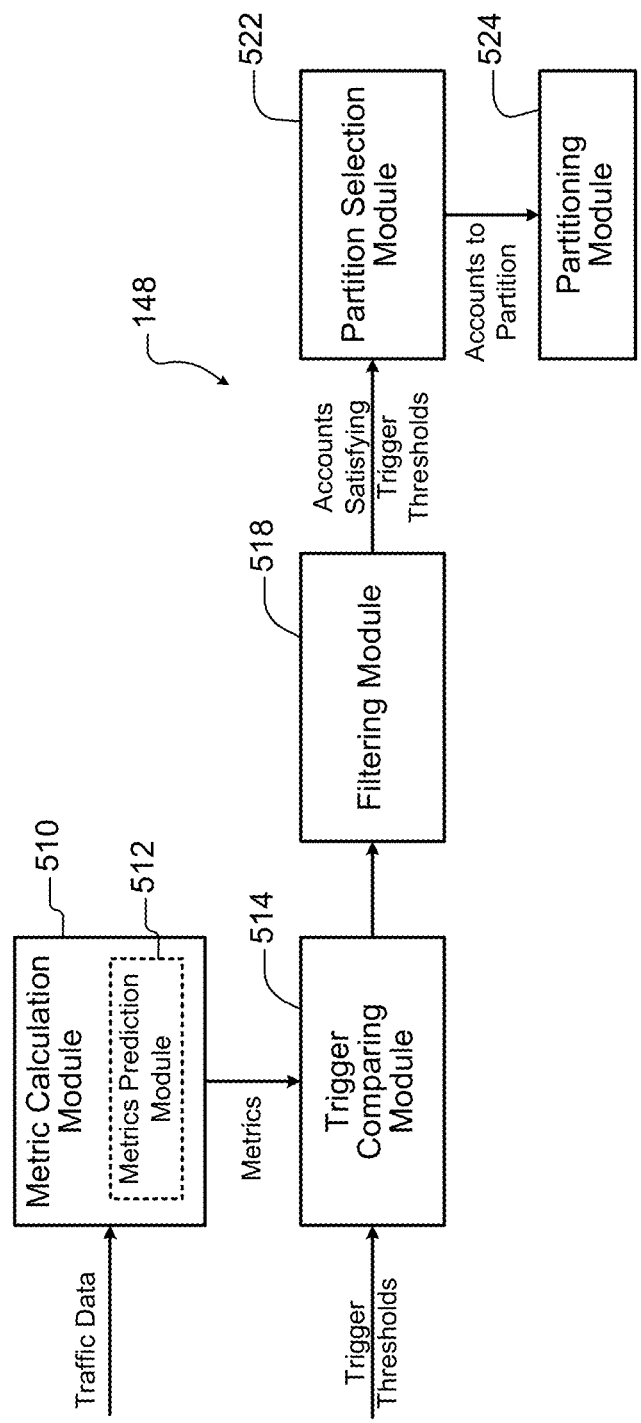
FIG. 10 is a functional block diagram of an example of a partition manager according to the present disclosure.

Referring now to FIG. 10, an example of a partition manager is shown. Traffic data is input to a metric calculation module 510 of the partition manager 148. There are many different examples of metrics. One example of the traffic metrics includes traffic mean, which is the average traffic volume during a given period. Another example includes traffic median, which is the median traffic volume during a given period. Other examples include traffic standard deviation and traffic daily variation. Traffic standard deviation includes the traffic volume standard deviation during the given period. The traffic daily variation is the sum of the absolute value of the change as compared to a prior period.

Metrics may also be generated for the N traffic levels. One example includes the traffic level mean which includes the average traffic volume on the level during the given period. Another example includes the traffic level median which includes the median traffic volume on the level during the given period. Another example includes traffic level standard deviation which is the traffic volume standard deviation for the traffic level during the given period.

Additional traffic metrics include quartile measurements such as Q1 and Q3 for the traffic level. Another traffic metric includes the number of traffic clusters per day. Another traffic metric includes traffic spike duration mean and standard deviation, which is the mean and standard deviation of the traffic spike duration during the given period. Additional traffic metrics include spike duration during Q1 and Q3 for the traffic level during the given period. Other metrics that may be calculated include the time to the next spike cluster mean for the next spike cluster standard deviation, traffic cycle width and traffic cycle strength.

The calculated metrics are output by the metric calculation module 510 to a trigger comparing module 514. The trigger comparing module 514 compares the calculated metrics to one or more trigger thresholds. One or more subsets of triggers (each including at least one different trigger) can be used to identify candidate partition accounts. Each of the triggers can involve a simple comparison or more complex functions. An output of the trigger comparing module 514 is filtered by a filtering module 518 to identify partition candidate accounts satisfying at least one subset of the trigger thresholds. A partition selection module 522 analyzes the filtered accounts and selects accounts to partition. A partition module 524 partitions the selected accounts.

One or more of the metrics can be compared to thresholds. One or more subsets of the metrics can be used to identify potential partition candidates. For example, M metrics can be used and the account can be partitioned if P of the M metrics are mot where P<M. Alternatively, T subsets of the M metrics can be used. Each of the T subsets include one or more of the M metrics.

In some examples, the metric calculation module 510 includes a metric prediction module 512 to predict metrics for an account based on prior metrics. In some examples, the metric prediction module 512 performs machine learning on the prior metric data to predict future metric data. In some examples, the metric prediction module 512 includes a gradient boosting machine (GBM), although other types of machine learning can be used.

In some examples, the metric prediction module 512 generates an offload partition count based on the metrics from iterative spike detection analysis. One server can service multiple partitions. An account can have one or more partitions that be distributed across more than one machine. As the traffic spikes increase, partitions increase, which may increase latency. The offload partition count includes the number of partitions that have been offloaded. In some examples, the partition manager determines whether or not to partition an account further based on the offload partition count.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A distributed data storage system comprising one or more processors and one or more computer-readable storage media storing instructions executable by the one or more processors to implement a traffic manager for the distributed data storage system, the traffic manager comprising:
   an iterative spike identifier executable to identify N levels of traffic spikes in traffic data on an account basis in a distributed data storage system, where N is greater than zero;
   a traffic cycle identifier executable to selectively identify cyclic traffic spikes in at least one of the N levels of traffic spikes for each of a plurality of accounts using autocorrelation and peak detection; and
   a partition manager executable to communicate with the traffic cycle identifier and to selectively partition one of the plurality of accounts based on the autocorrelation and the peak detection.

2. The distributed data storage system of claim 1, wherein the iterative identifier identifies the N levels of traffic spikes using N spike thresholds, respectively.

3. The distributed data storage system of claim 2, wherein the iterative spike identifier summarizes the traffic data into quartiles for each of the N levels of traffic spikes and the N spike thresholds are based on at least one of the quartiles for the corresponding one of the N levels of traffic spikes.

4. The distributed data storage system of claim 3, wherein the N spike thresholds are based on a sum of a third quartile, a factor and an interquartile range for the corresponding one of the N levels of traffic spikes.

5. The distributed data storage system of claim 1, wherein the partition manager includes a metric calculation module to calculate a plurality of metrics for the N levels of traffic spikes for the plurality of accounts.

6. The distributed data storage system of claim 5, wherein the partition manager further includes a trigger comparing module to compare the plurality of metrics to a plurality of triggers, respectively.

7. The distributed data storage system of claim 6, wherein the partition manager further includes a filtering module to identify a partition candidate account from the plurality of accounts having a predetermined subset of the plurality of the metrics exceeding corresponding ones of the plurality of triggers.

8. The distributed data storage system of claim 7, wherein the partition manager selectively partitions the partition candidate account.

9. The distributed data storage system of claim 5, wherein the metric calculation module predicts metrics using machine learning based on the plurality of metrics.

10. A traffic manager for a distributed data storage system, comprising:
    a processor; and
    a non-transitory computer-readable medium storing traffic management instructions for execution by the processor, the traffic management instructions being configured to:
    iteratively identify N levels of traffic spikes in traffic data on an account basis in a distributed data storage system, where N is greater than zero;
    selectively identify cyclic traffic spikes in at least one of the N levels of traffic spikes for each of a plurality of accounts using autocorrelation and peak detection; and
    selectively partition one of the plurality of accounts based on the autocorrelation and the peak detection.

11. The traffic manager of claim 10, wherein the traffic management instructions are configured to identify the N levels of traffic spikes using N spike thresholds, respectively.

12. The traffic manager of claim 11, wherein the traffic management instructions are configured to summarize the traffic data into quartiles for each of the N levels of traffic spikes, wherein the N spike thresholds are based on at least one of the quartiles for the corresponding one of the N levels of traffic spikes.

13. The traffic manager of claim 12, wherein the N spike thresholds are based on a sum of a third quartile, a factor and an interquartile range for the corresponding one of the N levels of traffic spikes.

14. The traffic manager of claim 10, wherein the traffic management instructions are configured to calculate a plurality of metrics for the N levels of traffic spikes for the plurality of accounts.

15. The traffic manager of claim 14, wherein the traffic management instructions are configured to compare the plurality of metrics to a plurality of triggers, respectively.

16. The traffic manager of claim 15, wherein the traffic management instructions are configured to identify a partition candidate account from the plurality of accounts having a predetermined subset of the plurality of the metrics exceeding corresponding ones of the plurality of triggers.

17. The traffic manager of claim 16, wherein the traffic management instructions are configured to partition the partition candidate account.

18. The traffic manager of claim 17, wherein the traffic management instructions are configured to use machine learning to select the partition candidate account.

19. A method for managing data traffic in a distributed data storage system, comprising:
- iteratively identifying N levels of traffic spikes in traffic data on an account basis in a distributed data storage system, where N is greater than zero;
- selectively identifying cyclic traffic spikes in at least one of the N levels of traffic spikes for each of a plurality of accounts using autocorrelation and peak detection; and
- selectively partitioning one of the plurality of accounts based on the autocorrelation and the peak detection.

20. The method of claim 19, further comprising:
- grouping the traffic data into quartiles for each of the N levels of traffic spikes,
- identifying the N levels of traffic spikes using N spike thresholds, respectively,
- wherein the N spike thresholds are based on at least one of the quartiles for the corresponding one of the N levels of traffic spikes.

* * * * *